United States Patent
Tanaka et al.

(10) Patent No.: US 9,774,827 B2
(45) Date of Patent: Sep. 26, 2017

(54) IMAGING INSPECTION APPARATUS FOR SETTING ONE OR MORE IMAGE-CAPTURING POSITIONS ON A LINE THAT CONNECTS TWO TAUGHT POSITIONS, CONTROL DEVICE THEREOF, AND METHOD OF CONTROLLING IMAGING INSPECTION APPARATUS

(71) Applicant: KAWASAKI JUKOGYO KABUSHIKI KAISHA, Kobe-shi, Hyogo (JP)

(72) Inventors: Hideki Tanaka, Nishinomiya (JP); Hiroaki Kitatsuji, Kobe (JP); Kazuhiko Kojima, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 377 days.

(21) Appl. No.: 14/377,667

(22) PCT Filed: Feb. 8, 2013

(86) PCT No.: PCT/JP2013/000699
§ 371 (c)(1),
(2) Date: Aug. 8, 2014

(87) PCT Pub. No.: WO2013/121760
PCT Pub. Date: Aug. 22, 2013

(65) Prior Publication Data
US 2015/0237308 A1 Aug. 20, 2015

(30) Foreign Application Priority Data
Feb. 14, 2012 (JP) .................................. 2012-029038

(51) Int. Cl.
*H04N 7/18* (2006.01)
*H04N 5/225* (2006.01)

(52) U.S. Cl.
CPC ............. *H04N 7/18* (2013.01); *H04N 5/2252* (2013.01); *Y10S 901/44* (2013.01); *Y10S 901/47* (2013.01)

(58) Field of Classification Search
CPC ...... H04N 7/18; H04N 5/2252; Y10S 901/44; Y10S 901/47
See application file for complete search history.

(56) References Cited

U.S. PATENT DOCUMENTS

| | | | | |
|---|---|---|---|---|
| 4,768,049 A | * | 8/1988 | Barrett | F16M 11/045 396/324 |
| 5,412,759 A | * | 5/1995 | Yano | G05B 19/4083 700/248 |

(Continued)

FOREIGN PATENT DOCUMENTS

| | | |
|---|---|---|
| JP | A-63-251192 | 10/1988 |
| JP | B2-7-46288 | 5/1995 |

(Continued)

OTHER PUBLICATIONS

May 14, 2013 International Search Report issued in International Application No. PCT/JP2013/000699.

*Primary Examiner* — Jay Patel
*Assistant Examiner* — Marnie Matt
(74) *Attorney, Agent, or Firm* — Oliff PLC (57) ABSTRACT

An imaging inspection apparatus includes a storage unit configured to store a predetermined position between a first position and a second position as a signal output position, the predetermined position being set by using a distance from a reference position that is based on at least one of the first position and the second position; an image-capturing command signal generator configured to determine, when causing a distal end portion of a robot to move from the first position to the second position, whether or not the distal end portion of the robot is located at the signal output position, (Continued)

and if it is determined that the distal end portion of the robot is located at the signal output position, the image-capturing command signal generator transmits, to the image-capturing device, an image-capturing command signal for capturing an image of the inspection object by using the image-capturing device.

13 Claims, 6 Drawing Sheets

(56) References Cited

U.S. PATENT DOCUMENTS

| | | | | |
|---|---|---|---|---|
| 2005/0107920 A1* | 5/2005 | Ban | ................ | B25J 9/1692 700/245 |
| 2005/0273202 A1* | 12/2005 | Bischoff | ................ | B25J 9/1692 700/263 |
| 2006/0023938 A1* | 2/2006 | Ban | ................ | G01B 21/042 382/153 |
| 2008/0123809 A1* | 5/2008 | Tudor | ................ | G01V 5/0083 378/57 |
| 2009/0231753 A1* | 9/2009 | Suzuki | ................ | G11B 15/688 360/92.1 |
| 2009/0281662 A1* | 11/2009 | Ueyama | ................ | B25J 9/1671 700/259 |
| 2012/0201448 A1* | 8/2012 | Nammoto | ................ | G06T 7/001 382/153 |
| 2013/0317646 A1* | 11/2013 | Kimoto | ................ | B25J 9/1651 700/250 |
| 2013/0331644 A1* | 12/2013 | Pandya | ................ | B25J 9/1682 600/102 |

FOREIGN PATENT DOCUMENTS

| | | |
|---|---|---|
| JP | A-10-264066 | 10/1998 |
| JP | A-2001-088073 | 4/2001 |
| JP | 3778795 B2 * | 5/2006 |

* cited by examiner

```
.PROGRAM samp1
 LMOVE A1
 SIGDEPART[ 500,1]
 LMOVE B1
 SIGDEPART[1000, 1]
 SIGDEPART[1100,-1]
 SIGAPPRO [ 600, 1]
 LMOVE B2
.END
```

Fig. 5

```
.PROGRAM samp2
  LMOVE A1
  KI[1,0.2, 500,0]
  LMOVE B1
  KI[1,0.2,1000,0]
  KI[1,0.2,1500,0]
  LMOVE B2
.END
```

IMAGING INSPECTION APPARATUS FOR SETTING ONE OR MORE IMAGE-CAPTURING POSITIONS ON A LINE THAT CONNECTS TWO TAUGHT POSITIONS, CONTROL DEVICE THEREOF, AND METHOD OF CONTROLLING IMAGING INSPECTION APPARATUS

TECHNICAL FIELD

The present invention relates to an imaging inspection apparatus for performing a visual inspection or the like of an inspection object by using a multi-axis robot, and to a control device of the imaging inspection apparatus, and to a method of controlling the imaging inspection apparatus.

BACKGROUND ART

In imaging inspection apparatuses for performing a visual inspection or the like of an inspection object by using a multi-axis robot an image-capturing device is mounted on a distal end portion of the robot. Such an imaging inspection apparatus is configured to teach an image-ca pun position to the robot as a movement position for the distal end portion of the robot, thereby causing the robot to move to the predetermined movement position (the taught position), and then perform image capturing. However, in a case where the robot is caused to stop at every image-capturing position, which is a taught position, there is a problem in that the more the image-capturing positions, the more time it takes to perform the image-capturing process.

Patent Literature 1, which is described below, proposes a configuration for solving the above problem. The configuration disclosed in Patent Literature 1 is based on known control such that, in a case where there are three taught positions taught to a robot, a motion command to move from a first taught position to a second taught position and a motion command to move from the second taught position to a third taught position are set to overlap each other, thereby suppressing a decrease in the speed of the motion of the robot and allowing the robot to move smoothly. However based on this control, an actual robot motion trajectory will not pass through the second taught position unless the first to third taught positions are arranged on a straight line (i.e., the robot passes the inner angle side of straight lines connecting the taught positions). Accordingly, in the configuration disclosed in Patent Literature 1 the following process is performed: set the second taught position (=image-capturing position), which is to be taught in advance, as a position located outside the original second taught position (i.e., as a position located on a side that is not the inner angle area formed by the straight lines connecting the taught positions).

CITATION LIST

Patent Literature

PTL 1 Japanese Laid-Open Patent Application Publication No. 2001-88073

SUMMARY OF INVENTION

Technical Problem

An image captured by the imaging injection apparatus is compared with a predetermined sample image, and intended image determination is performed based on the comparison to determine, for example, whether or not machining has been performed successfully, whether or not a component has been attached successfully whether or not there is any damage, etc. When performing such image determination, image processing is performed in order to compare the captured image with the sample image. In such image processing, the more precise the image-capturing position (i.e., the less the positional deviation from the sample image), the faster the processing speed. In order to improve the precision in the image-capturing position, it is preferable to make the robot motion trajectory as short as possible (i.e., make the relative distance between the image-capturing device and the inspection object as short as possible). However, if the relative distance between the image-capturing device and the inspection object becomes short, then the image-capturing pitch becomes short. Accordingly in the configuration of Patent Literature 1, in which the control inevitably involves decrease in speed the decrease in speed becomes prominent. Thus, high-speed control cannot be realized.

In the first place, the moving speed of the robot, and a positional precision indicating the degree of coincidence between a position taught to the robot and a position to which the robot actually moves, are conflicting factors with each other. That is, if it is attempted to increase the moving speed of the robot, the positional precision when causing the robot to move to the taught position is lowered, whereas if it is attempted to cause the robot to move to the taught position with high positional precision, the moving speed of the robot cannot be increased. For this reason, with the configuration disclosed in Patent Literature 1, there is a limit to increasing the moving speed of the robot while maintaining high positional precision in locating the robot to the image-capturing position.

Moreover, in a case where one or a plurality of image-capturing positions are set on a line that connects two taught positions taught to the robot, conventional methods require a taught position or taught positions to be additionally set between the two taught positions. In this case, compared to a case where only the first taught position and the final taught position are taught to the robot, there are problems as described below. Specifically, there is a problem in that the inspection time increases in accordance with an increase in the number of taught positions since the moving speed of the robot is reduced near the taught positions. There is also another problem in that since the teaching of the taught positions (image-capturing positions) is performed manually, a teaching error may occur, and due to the teaching error, actual movement positions (i.e., the movement trajectory of the robot deviate not only from the taught position regarding which the teaching error has been made but also from the immediately previous taught position (movement position). Consequently, the precision in the image-capturing positions cannot be made high.

The present invention has been made in order to solve the above-described problems. An object of the present invention is to provide: an imaging inspection apparatus capable of increasing the speed of control of the movement of the robot while maintaining high precision in image-capturing positions; a control device of the imaging inspection apparatus; and a method of controlling the imaging inspection apparatus.

Solution to Problem

A control device of an imaging inspection apparatus according to the present invention is a control device of an imaging inspection apparatus in which one of an image-capturing device and an inspection object is mounted on a distal end portion of a robot including a plurality of axes. The imaging inspection apparatus is configured to inspect the inspection object by capturing an image of the inspection object by using the image-capturing device. The control device includes: a motion controller configured to give a motion command for each axis when causing the distal end portion of the robot to move horn a first position to a second position; a storage unit configured to store a predetermined position between the first position and the second position as a signal output position, the predetermined position being set by using a distance from a reference position that is based on at least one of the first position and the second position; and an image-capturing command signal generator configured to determine, when causing the distal end portion of the robot to move from the first position to the second position, whether or not the distal end portion of the robot is located at the signal output position, and if it is determined that the distal end portion of the robot is located at the signal output position, the image-capturing command signal generator transmits, to the image-capturing device, an image-capturing command signal for capturing an image of the inspection object by using the image-capturing device.

According to the above configuration, the first position and the second position are taught as taught positions for the distal end portion of the robot, on which the image-capturing device or the inspection object is mounted, and the predetermined position between the first position and the second position is set as the signal output position by using the distance from the reference position that is based on at least one of the first position and the second position. While the distal end portion of the robot is moving from the first position to the second position, when the distal end portion of the robot passes through the signal output position, an image-capturing command signal is transmitted to the image-capturing device, and the image-capturing device captures an image of the inspection object. Accordingly, it is not necessary to set the image-capturing position (signal output position) as a taught position taught to the robot. As a result, while performing image capturing at image-capturing positions, the robot can be moved without stopping the robot or reducing the speed of the robot at the image-capturing positions. This makes it possible to increase the speed of control of the movement of the robot while maintaining high precision in the image-capturing positions.

The control device may include a first direction corrector configured to determine whether or not a difference in a direction of a line connecting the first position and the second position (hereinafter, a first direction) between an actual image-capturing position where the image-capturing device has captured an image based on the signal output position and a predetermined intended image-capturing position is greater than or equal to a predetermined value. If the difference in the first direction is greater than or equal to the predetermined value, the first direction corrector corrects the signal output position by changing the distance from the reference position in accordance with the difference. According to this configuration, the feature that the robot makes linear movement from the first position to the second position since the image-capturing position (signal output position) is not a taught position taught to the robot, is utilized for error correction in such a manner that an error in the first direction, which is the direction of the linear movement, is corrected by adjusting the distance from the reference position. Therefore, the error in the first direction can be readily corrected with high precision.

The control device may include a second direction corrector configured to determine whether or not a difference in a direction perpendicular to a line connecting the first position and the second position (hereinafter, a second direction) between an actual image-capturing position where the image-capturing device has captured an image based on the signal output position and a predetermined intended image-capturing position is greater than or equal to a predetermined value. If the difference in the second direction is greater than or equal to the predetermined value, the second direction corrector sets a third position on a straight line that connects a position corresponding to the first position (hereinafter, an actual first position) and the intended image-capturing position, the actual first position being a position where the distal end portion of the robot has actually been located, such that the third position is set at an opposite side to the actual first position with respect to the intended image-capturing position, and the second direction corrector sets a predetermined position between the actual first position and the third position as a new signal output position by using a distance from a reference position that is based on at least one of the actual first position and the third position. The motion controller may give a motion command for each axis so as to cause the distal end portion of the robot to move from the first position to the second position through the third position. In this manner, the error in the second direction can also be corrected, which makes it possible to improve the positional precision.

A plurality of the signal output positions may be arranged between the first position and the second position. Accordingly, by merely teaching one movement start position and one movement end position to the robot as taught positions, the image capturing can be performed without reducing the moving speed of the robot at the plurality of positions between the movement start position and the movement end position; the number of motions of the robot (i.e., the number of teachings) can be reduced so that the inspection time can be shortened; and without separately tea thing the orientation of the distal end portion the robot at the plurality of image-capturing positions between the first position and the second position, the orientation of the distal end portion can be highly maintained.

An imaging inspection apparatus according to another aspect of the present invention includes: a robot including a plurality of axes and configured such that one of an inspection object and an image-capturing device is mounted on a distal end portion of the robot, the robot being configured to move the distal end portion relative to the other one of the inspection object and the image-capturing device; an inspection device configured to inspect the inspection object based on an image captured by the image-capturing device; and a controller configured to control the robot and the image-capturing device. The controller includes: a motion controller configured to give a motion command for each axis when causing the distal end portion of the robot to move from a first position to a second position; a storage unit configured to store a predetermined position between the first position and the second position as a signal output position, the predetermined position being set by using a distance from a reference position that is based on at least one of the first position and the second position; and an image-capturing command signal generator configured to determine whether or not the distal end portion of the robot is located at the signal output position, and if it is determined that the distal end portion of the robot is located at the signal output position, the image-capturing command signal generator transmits, to the image-capturing device, an image-capturing command signal for capturing an image of the inspection object by using the image-capturing device.

A method of controlling an imaging inspection apparatus according to yet another aspect of the present invention is a method of controlling an imaging inspection apparatus in which one of an image-capturing device and an inspection object is mounted on a distal end portion of as robot including a plurality of axes. The imaging inspection apparatus is configured to inspect the inspection object by capturing an image of the inspection object by using the image-capturing device. The method includes: giving a motion command for each axis when causing the distal end portion of the robot to move from a first position to a second position; setting as predetermined position between the first position and the second position as a signal output position by using a distance from a reference position that is based on at least one of the first position and the second position; and determining whether or not the distal end portion of the robot is located at the signal output position, and if it is determined that the distal end portion of the robot is located at the signal output position, transmitting, to the image-capturing device, an image-capturing command signal for capturing an image of the inspection object by using the image-capturing device.

According to the above method, the first position and the second position are taught as taught positions for the distal end portion of the robot, on which the image-capturing device or the inspection object is mounted, and the predetermined position between the first position and the second position is set as the signal output position by using the distance from the reference position that is based on at least one of the first position and the second position. While the distal end portion of the robot is moving from the first position to the second position, when the distal end portion of the robot passes through the signal output position, an image-capturing command signal is transmitted to the image-capturing device, and thereby the image-capturing device captures an image of the inspection object. Accordingly, it is not necessary to set the image-capturing position (signal output position) as a taught position taught to the robot. As a result, while performing image capturing at image-capturing positions, the robot can be moved without stopping the robot or reducing the speed of the robot at the image-capturing positions. This makes it possible to increase the speed of control of the movement of the robot while maintaining high precision in the image-capturing positions.

The above object, other objects, features, and advantages of the present invention will be made clear by the following detailed description of preferred embodiments with reference to the accompanying drawings.

Advantageous Effects of Invention

The present invention is configured as described above, and provides an advantage of being capable of increasing the speed of control of the movement of the robot while maintaining high precision in image-capturing positions.

DESCRIPTION OF EMBODIMENTS

Hereinafter, one embodiment of the present invention is described with reference to the drawings. In the drawings, the same or corresponding elements are denoted by the same reference signs, and repeating the same descriptions is avoided below.

Figure 1:
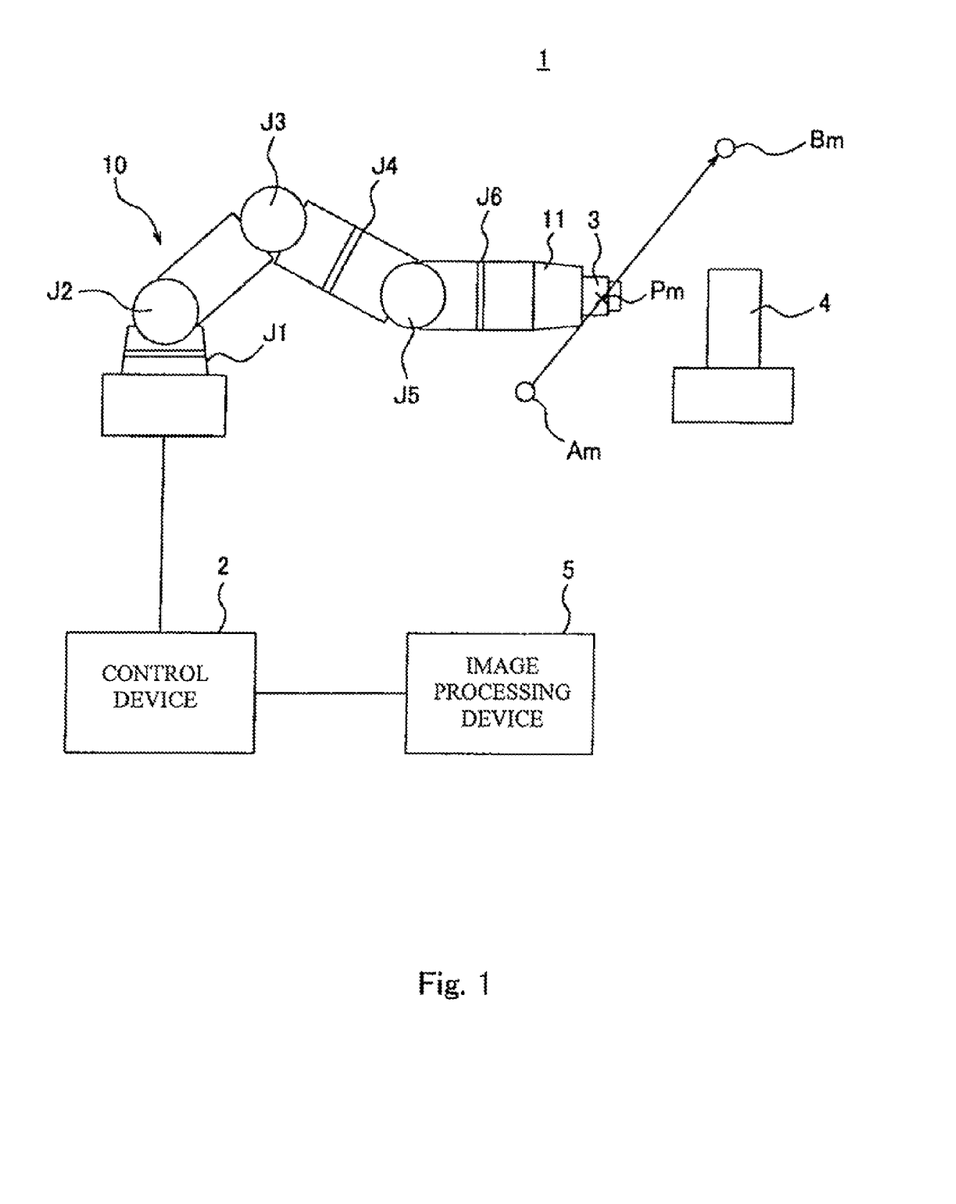
FIG. 1 is a block diagram showing a schematic configuration of an imaging inspection apparatus according to one embodiment of the present invention.
Figure 2:
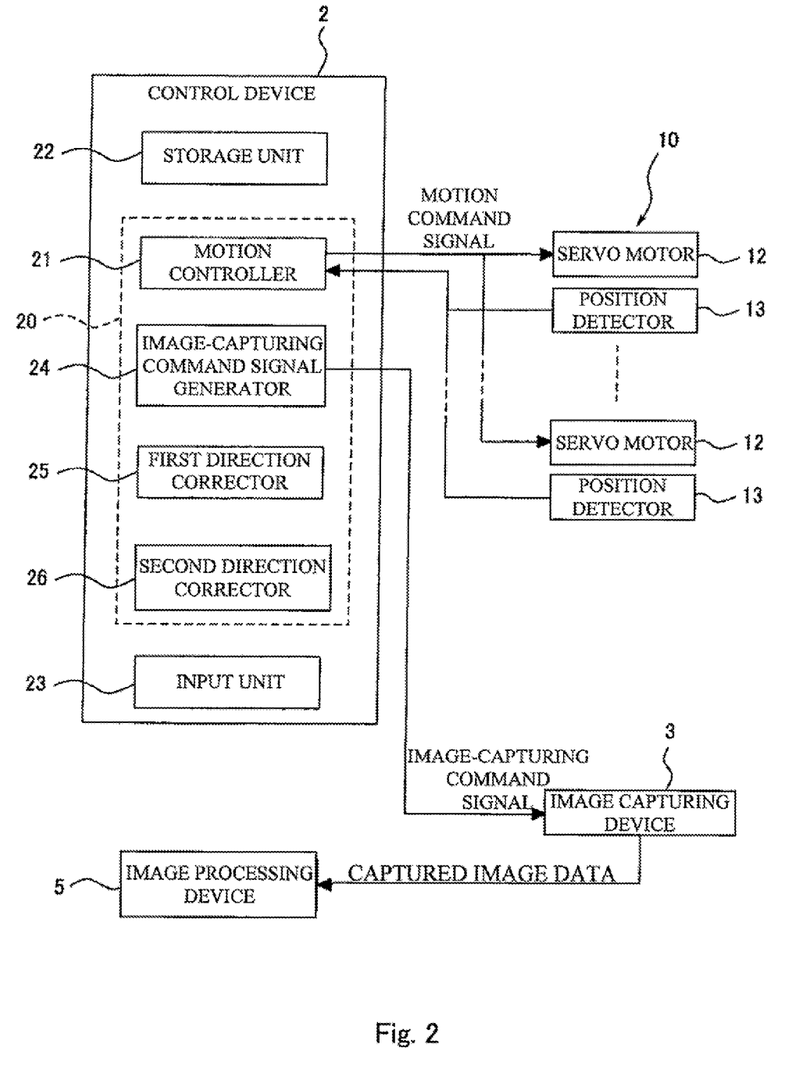
FIG. 2 shows functional blocks of the imaging inspection apparatus shown in FIG. 1.

First, a schematic configuration of an imaging inspection apparatus according to the embodiment of the present invention is described. FIG. 1 is a block diagram showing the schematic configuration of the imaging inspection apparatus according to the embodiment of the present invention. FIG. 2 shows functional blocks of the imaging inspection apparatus shown in FIG. 1.

As shown in FIG. 1, an imaging inspection apparatus 1 according to the present embodiment includes an image-capturing device 3 mounted on a distal end portion 11 of a multi-axis (six axes J1 to J6 in FIG. 1) robot 10. In the case of performing a visual inspection, the image-capturing device 3 is configured as a CCD camera, for example. In the case of performing a non-destructive internal inspection, the image-capturing device 3 is configured as an X-ray camera, for example. The imaging inspection apparatus 1 is configured such that a control device (controller) 2 controls the robot 10 and the image-capturing device 3. The imaging inspection apparatus 1 inspects an inspection object 4, which is set at a predetermined position, by capturing an image of the inspection object 4 by using the image-capturing device 3. Specifically, data of the captured image of the inspection object 4 captured by the image-capturing device is transmitted to an image processing device (inspection device) 5. Based on the transmitted captured image data the image processing device 5 performs a predetermined inspection. For example, the image processing device 5 compares the image that is based on the captured image data with a pre-captured sample image, and determines whether or not there is any lacking component, whether or not there is any damage, whether or not machining has been performed successfully, etc. The image processing device 5 may be provided inside the control device 2 (such that the image processing device 5 is integrated with the control device 2), or may be provided separately from the control device 2.

The control device 2 causes the distal end portion 11 of the robot 10 (i.e., the image-capturing device 3 mounted on the distal end portion 11) to move to an intended position in an intended orientation along an intended path. Specifically, the control device 2 includes a motion controller 21, which is configured to give a motion command for each axis of the robot 10 when causing the distal end portion 11 of the robot 10 to move from a movement start position (a first position) to a movement end position (a second position). Each of the axes J1 to J6 of the robot 10 is provided with a servomotor 12 and a position detector 13. The position detector 13 is configured as a rotary encoder, for example. Each servomotor 12 is driven based on a control command from the control device 2 and thereby rotational motion around each of the axes J1 to J6 is made. In the present embodiment, the motion controller 21 teaches coordinates of the movement start position and the movement end position of the distal end portion 11 of the robot 10, and performs compensating control such that the distal end portion 11 linearly moves between the movement start position and the movement end position. It should be noted that the servomotors 12 an be driven independently of each other. When the servomotors 12 are driven, the corresponding position detectors 13 detect rotational angles (rotational positions) of the respective servomotors 12 around the axes J1 to J6. It should be noted that the control device 2 and the robot 10 may be connected to each other by serial connection, or may be connected to each other via a wired or wireless communication network.

The control device 2 includes: an arithmetic operation unit 20 including the motion controller 21; and a storage unit 22. The control device 2 can be constituted by a general computer. The storage unit 22 stores various data and an arithmetic operation program that are used in arithmetic operations performed by the arithmetic operation unit 20. The control device 2 further includes an input unit 23, with which to teach a motion to the robot 10. The input unit 23 is constituted by a teach pendant for example. The motion controller 21 calculates a target movement position, to which the distal end portion 11 of the robot 10 is to be located, based on a teaching operation inputted via the input unit 23. The target movement position is calculated based on an operation time and a moving distance. The moving distance is obtained from, for example, a setting value of the moving speed of the distal end portion 11 of the robot 10. Moreover, the motion controller 21 calculates a rotational angle (rotational position) for each of the axes J1 to J6 of the robot 10 based on the target movement position. Then, based on deviations between the calculated rotational angles of the respective axes J1 to J6 and the rotational positions of the respective axes J1 to J6 before moving, the motion controller 21 calculates command values that specify operating amounts of the respective servomotors 12 corresponding to the axes J1 to J6, and outputs motion command signals to the respective servomotors 12. As a result, the distal end portion 11 of the robot 10 moves from the movement start position (first position An; n=1, 2, . . . ) to the movement end position (second position Bn).

In the present embodiment the image-capturing position where the image-capturing device 3 captures an image is set at a predetermined position between the first position An and the second position Bn. The image-capturing position herein is set as a signal output position Pm (m=1, 2, . . . ) for transmitting an image-capturing command signal from the control device 2 to the image-capturing device 3. Specifically, the arithmetic operation unit 20 of the control device 2 determines, when causing the distal end portion 11 of the robot 10 to move from the first position An to the second position Bn, whether or not the distal end portion 11 of the robot 10 is located at the signal output position Pm. It is determined that the distal end portion 11 of the robot 10 is located at the signal output position Pm, the arithmetic operation unit 20 functions as an image-capturing command signal generator 24, which transmits, to the image-capturing device 3, an image-capturing command signal for capturing an image of the inspection object 4 by using the image-capturing device 3. The signal output position is set when a setting is inputted from the input unit 23, such that the signal output position is set by using a distance from a reference position that is based on at least one of the first position An and the second position Bn. The set signal output position is stored in the storage unit 22.

Figure 3:
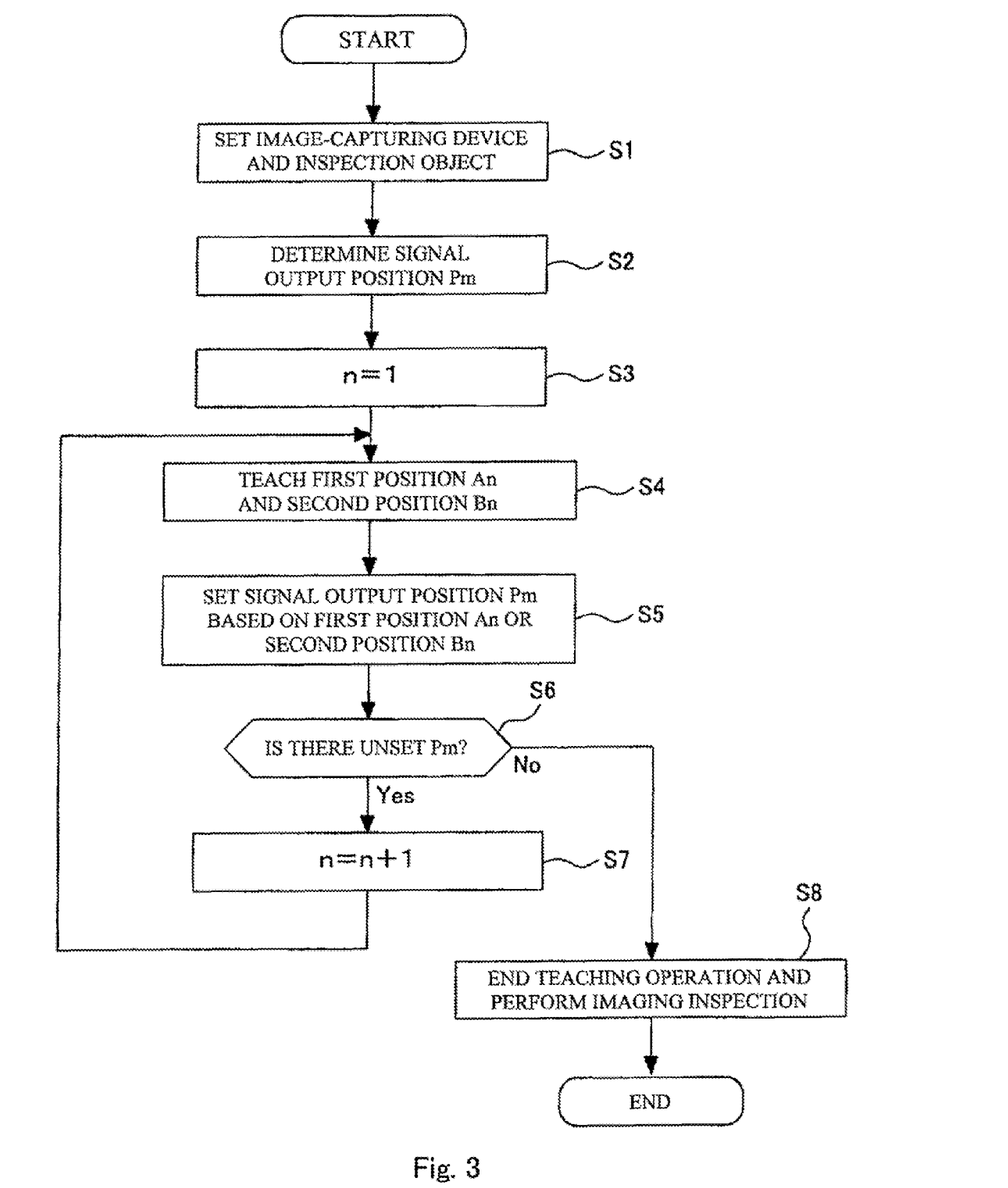
FIG. 3 is a flowchart illustrating teaching steps performed by the imaging inspection apparatus shown in FIG. 1.
Figure 4:
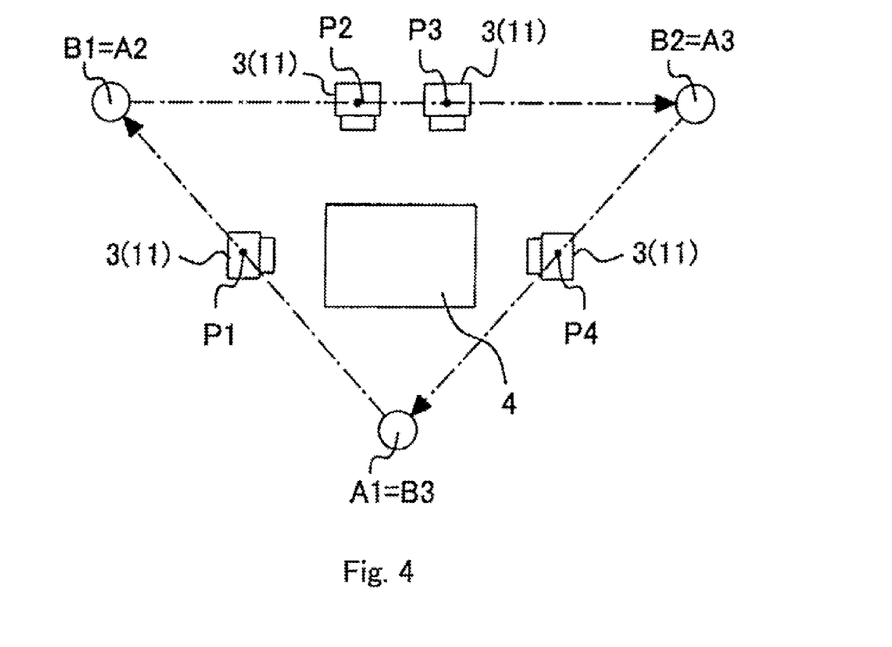
FIG. 4 is a schematic diagram showing one example of a moving path of a distal end potion of a robot in the imaging inspection apparatus shown in FIG. 1.

Hereinafter, specific teaching steps according to the present embodiment are described. FIG. 3 is a flowchart illustrating teaching steps performed by the imaging inspection apparatus shown in FIG. 1. FIG. 4 is a schematic diagram showing one example of a moving path of the distal end portion of the robot in the imaging inspection apparatus shown in FIG. 1. As shown in FIG. 3, first, the image-capturing device 3 is mourned on the distal end portion 11 of the robot 10, and the image-capturing device 3 is configured such that the image-capturing device 3 performs an image-capturing operation in accordance with an image-capturing command signal from the image-capturing command signal generator 24 of the control device 2 (step S1). Also, the inspection object 4 is set at a predetermined position.

Then, a signal output position Pm, which is a position for the robot to capture an image of an inspected portion of the inspection object 4, is determined (step S2). In a case where there are a plurality of signal output positions Pm as shown in FIG. 4 (in FIG. 4, m=1, . . . , 4) each of the plurality of signal output positions Pm is determined. In addition, n indicating the number of combinations of the first position An and the second position Bn (combination number) is set to 1 (step S3). Then, a teaching operation of teaching the first position An and the second position Bn is performed by rising the input unit 23, such that the distal end portion 11 of the robot 10 passes through the signal output position Pm (step S4).

In a case where there are a plurality of signal output positions Pm, the first position An and the second position Bn are set such that, among the plurality of signal output positions Pm, as many signal output positions Pm as possible are connected by a straight path. For example, in the example of FIG. 4, the orientation of the distal end portion 11 of the robot 10 is the same at signal output positions P2 and P3, and the distance between the signal output positions P2 and P3 is short (i.e., not causing the path to be complex). Therefore, a first position A2 and a second position B2 are set such that the signal output positions P2 and P3 are arranged on a straight line between the first position A2 and the second position B2. In this manner, a plurality of signal output positions Pm may exist between the first position An and the second position Bn. Accordingly, by merely teaching one movement start position and one movement end position to the robot as taught positions, the image capturing can be performed without reducing the moving speed of the robot at the plurality of positions between the movement start position and the movement end position; the number of motions of the robot (i.e., the number of teachings) can be reduced so that the inspection time can be shortened and without separately teaching the orientation of the distal end portion 11 of the robot 10 at the plurality of image-capturing positions between the movement start position and the movement end position, the orientation of the distal end portion 11 can be highly maintained.

Next, each signal output position Pm between the first position An and the second position Bn is set by means of the input unit 23 by using a distance from a reference position that is based on at least one of the taught first position An and second position Bn (step S5). A specific method of setting the signal output position Pm will be described below.

Then, regarding the image-capturing positions (signal output positions) Pm determined in step S2, a determination is made whether there still is an unset signal output position Pm (i.e., whether all the signal output positions Pm have been set by the input unit 23) (step S6). If there still is an unset signal output position Pm (Yes in step S6), the first position An and the second position Bn in which n=n+1 are taught, and the signal output position Pm is set (the flow returns to step S4 through step S7). In this case, in step S4, the immediately previous second position Bn coincides with the following first position An (Bn=An+1). Therefore, practically, teaching only the second position Bn will suffice. Moreover, in a case where the robot 10 is eventually returned to a position where the robot 10 is located before the start of its operation (e.g., a case where the robot 10 repeatedly inspects a plurality of inspection objects 4 that have the same shape), the teaching is performed such that the final second position Bn is the initial first position A1.

If all the signal output positions Pm have been set by the input unit 23 (No in step S6), the teaching operation is ended, and the robot 10 is caused to actually operate to perform an imaging inspection (step S8).

According to the above configuration, while the distal end portion 11 of the robot 10 is moving from the first position An to the second position Bn, when the distal end portion 11 of the robot 10 passes through the signal output position Pm, an image-capturing command signal is transmitted to the image-capturing device 3, and the image-capturing device 3 captures an image of the inspection object 4. Accordingly, it is not necessary to set the image-capturing position (signal output position Pm) as a taught position (movement end position) taught to the robot 10. As a result, while performing image capturing at image-capturing positions, the robot 10 can be moved without stopping the robot 10 or reducing the speed of the robot 10 at the image-capturing positions. This makes it possible to increase the speed of control of the movement of the robot 10 while maintaining high precision in the image-capturing positions.

Figure 5:
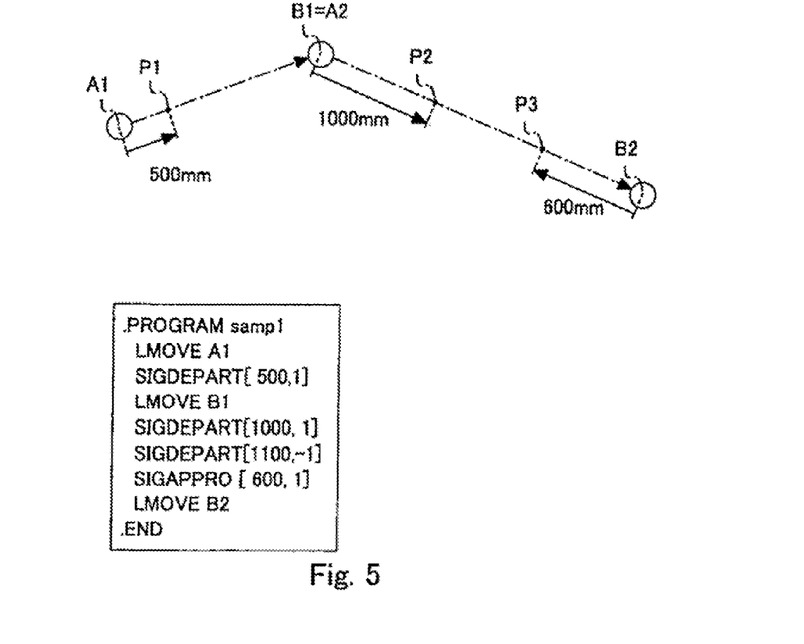
FIG. 5 is a schematic diagram showing a first example of a method of setting a signal output position, which is implemented in the imaging inspection apparatus shown in FIG. 1.

Hereinafter, a specific method of setting the signal output position Pm is described. FIG. 5 is a schematic diagram showing a first example of the method of setting the signal output position, which is implemented in the imaging inspection apparatus shown in FIG. 1. It should be noted that FIG. 5 also shows an example of a teaching program inputted from the input unit 23 in the first example. In the example shown in FIG. 5, each signal output position Pm is set based on a taught position (command value) of the distal end portion 11 of the robot 10. That is, as a reference position based on at least one of the taught first position An and second position Bn, the first position An itself or the second position Bn itself is used.

In the example shown in FIG. 5, a signal output position P1 is set at a position that is advanced from the first position A1 toward the second position B1 by 500 mm; a signal output position P2 is set at a position that is advanced from the first position A2 (the second position B1) toward the second position B2 by 1000 mm; and a signal output position P3 is set at a position here the distance to the second position B2 is reduced to 600 mm.

Accordingly, the teaching program is configured by combining the following commands: a command "LMOVE (X)" to make linear movement to a movement position (taught position) X; a command "SIGDEPART [L, Y]" to output a signal (Y=1) or to stop outputting a signal (Y=−1) when having moved away, by a predetermined distance L, from a position indicated by the immediately previous LMOVE command (although the program indicates the position as the second position Bn except for the initial position, in fact, the movement start position for the next movement means the first position An+1); and a command "SIGAPPRO [L, Y]" to output an image-capturing command signal (Y=1) or to stop outputting an image-capturing command signal (Y=−1) when having approached the second position Bn indicated by the immediately following LMOVE command such that the distance to the second position Bn becomes the predetermined distance L.

For example, "LMOVE B1" means a command to make linear movement to the second position B1; "SIGDEPART [1000, 1]", which follows "LMOVE B1", means a command to start outputting an image-capturing command signal at a position that is 1000 mm away from the second position B1 (the first position A2); "SIGDEPART [1100, −1]" means a command to stop outputting the image-capturing command signal at a position that is 1100 mm away from the second position B1 (the first position A2) (i.e., at a position that is 100 min may from the signal output position P2); and SIGAPPRO [600, 1] which follows "SIDGEPART [1100, −1]", means a command to start outputting an image-capturing signal when having approached the second position B2 such that the distance to the second position B2 becomes 600 mm after receiving "LMOVE B2", which follows "SIGAPPRO [600, 1]". It should be noted that the teaching program in the above example is programmed to in a case where an image-capturing command signal is temporarily being outputted in accordance with a SIGDEPART command or SIGAPPRO command, stop outputting the image-capturing command signal when having reached the second position Bn even without a SIGDEPART command or SIGAPPRO command (e.g., in as case where an image-capturing command signal is being outputted in accordance with a SIGAPPRO command that precedes "LMOVE B2", outputting the image-capturing command signal is stopped when becoming located at the second position B2). Of course, in every case, a command to stop outputting the image-capturing command signal may be given separately.

By using a taught position (command value) as the reference position as described above, the motion control of the robot 10 can be performed relatively easily. Since the signal output position Pin on be set based on a future position (the second position Bn that has not been reached), various manners of setting the signal output position Pm can be adopted depending on the situation. For example, in a case where the signal output position Pm is in close proximity to the second position Bn, setting the signal output position Pm by using the second position Bn as the reference position makes it possible to prevent such errors as follows: the distal end portion 11 of the robot 10 approaches the second position Bn too closely due to a movement error of the distal end portion 11; an image-capturing command signal is not outputted even though the distal end portion 11 has reached the second position Bn.

Figure 6:
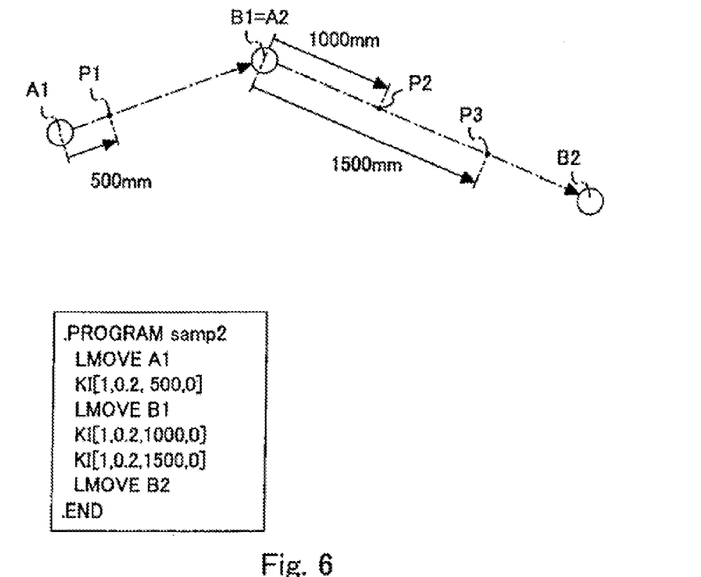
FIG. 6 is a schematic diagram showing a second example of the method of setting a signal output position, which is implemented in the imaging inspection apparatus shown in FIG. 1.

Instead of the example of FIG. 5, the signal output position Pm may be set based on an actual movement position of the distal end portion 11 of the robot 10. FIG. 6 is a schematic diagram showing a second example of the method of setting the signal output position, which is implemented in the imaging inspection apparatus shown in FIG. 1, it should be noted that FIG. 6 also shows an example of a teaching program inputted from the input unit 23 in the second example. In the example shown in FIG. 6, a movement end position that has actually been reached based on the taught first position An and second position Bn (ideally, the second position Bn) is used as the reference position.

Also in the example shown in FIG. 6, setting is made such that image capturing is performed at the same position as in the example shown in FIG. 5. However, in the example shown in FIG. 6, since the setting is made based on an actual movement position of the distal end portion 11 of the robot 10, the signal output positions P2 and P3 are set with reference to the position of the distal end portion 11 of the robot 10 after the distal end portion 11 has actually moved based on the taught second position B1 (i.e., with reference to an actual movement start position). As a result, the signal output positions P2 and P3 are set as positions that are advanced from the actual movement start position toward the second position B2 by 1000 mm and 1500 mm, respectively.

Accordingly, the teaching program is configured by combining the following commands: a command "LMOVE, (X)" to make linear movement to a movement position (taught position) X; and a command "KI [Y, T, L, Z]" to output an image-capturing command signal for a time T when having moved away from the actual movement start position by a predetermined distance L (Y=1). In this example, the KI command contains information about the time for which the image-capturing command signal is to be outputted. Therefore, unlike the example shown in FIG. 5, a command to stop outputting the image-capturing command signal is not necessary. The element Z in the command KI indicates a correction time, which allows correction of the time for which the image-capturing command signal is to be outputted. This makes it possible to finely adjust a timing of transmitting the image-capturing command signal and a period of time for transmitting the image-capturing command signal in accordance with an actual operating situation.

For example, "KI [1, 0.2, 1000, 0]" and "KI [1, 0.2, 1500, 0]", which follow "LOVE B1", are such that "KI [1, 0.2, 1000, 0]" means a command to output an image-capturing command signal for 0.2 second at a position that is 1000 mm away from the second position B1 (the first position A2), and "KI [1, 0.2, 1500, 0]" cans a command to output an image-capturing command signal for 0.2 second at a position that is 1500 mm away from the second position B1 (the first position A2).

In general, an actual position of the distal end portion 11 of the robot 10 is delayed from a command value. Therefore, in a case where a signal output position is set with reference to a command value, there is a possibility that an image is captured at a position that deviates from an intended image-capturing position toward the second position Bn (or there is a case where it is difficult to improve the precision in the image-capturing position since it is necessary to set the signal output position Pm by taking account of the positional deviation). In view of this as in the example shown in FIG. 6, by using an actual movement position of the distal end portion 11 of the robot 10 as the reference position, an image-capturing signal can be outputted an image can be captured) at a position that is closer to the intended image-capturing position than in a ease where a command value is used as the reference position. This makes it possible to adjust the image-capturing position with high precision and obtain as captured image with a less positional deviation.

When the teaching as described above is performed and the robot 10 is actually operated, there is a case where the distal end portion 11 moves to as position that deviates from the taught second position Bn due to errors in movement control of the robot 10. If the actual movement position of the distal end portion 11 of the robot 10 is different from the taught position, than the position at which the image-capturing command signal is actually outputted is different from the signal output position Pm, which is set based on the first position An or the second position Bn. In view of this, in the present embodiment, the positional deviation from the taught position is corrected with respect to the following two directions separately: the direction of as line that connects the first position An and the second position Bn (a first direction); and the direction perpendicular to the first direction in plan view (a second direction).

To be more specific, first, the arithmetic operation unit 20 of the control device 2 determines whether or not a difference in the first direction between an actual image-capturing position where the image-capturing device 3 has captured an image based on the signal output position Pm and a predetermined intended image-capturing position is greater than or equal to a predetermined value. If the difference in the first direction is greater than or equal to the predetermined value, the arithmetic operation unit 20 functions as a first direction corrector 25, which corrects the signal output position Pm by changing a distance L from a reference position in accordance with the difference.

For example, captured image data captured at the signal output position Pm is transmitted from the image-capturing device 3 to the image processing device 5. The image processing device 5 compares an image that is based on the captured image data with a sample image to measure the amount of positional deviation between these images, and transfers the result of the measurement to the control device 2. The first direction corrector 25 determines whether or not the transferred amount of positional deviation is greater than or equal to a predetermined value. If it is determined that the transferred amount of positional deviation is greater than or equal to the predetermined value, then in accordance with the amount of positional deviation, the first direction corrector 25 changes the value of the distance L at the corresponding signal output position Pm, the value being previously set by the teaching program. For example, in the example of FIG. 5, if as position where image capturing has actually been performed corresponding to a position set as the signal output position P2 deviates from the signal output position P2 toward the second position B2 by 10 mm, then the value of the distance L is corrected such that the amount of positional deviation 10 mm is subtracted from the distance L (=1000) from the first position A2. It should be noted that the measurement of the amount of positional deviation may be performed in the control device 2. Moreover, instead of directly changing the value of the distance L, a correction amount may be separately added to or subtracted from the distance L at the time of teaching.

According to the above, the feature that the robot 10 makes linear movement from the first position An to the second position Bn since the image-capturing position (signal output position Pm) is not a taught position taught to the robot 10, is utilized for error correction in such a manner that an error in the first direction, which is the direction of the linear movement, is corrected by adjusting the distance L from the reference position. Therefore, the error in the first direction can be readily corrected with high precision.

Figure 7A:
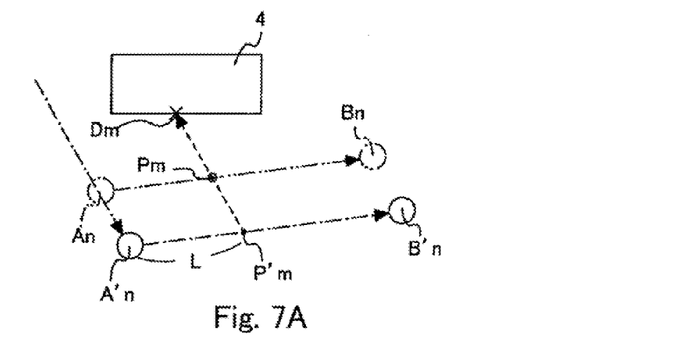
FIG. 7A is a schematic diagram showing steps of second-direction vector correction of a signal output position, which are performed in the imaging inspection apparatus shown in FIG. 1.
Figure 7B:
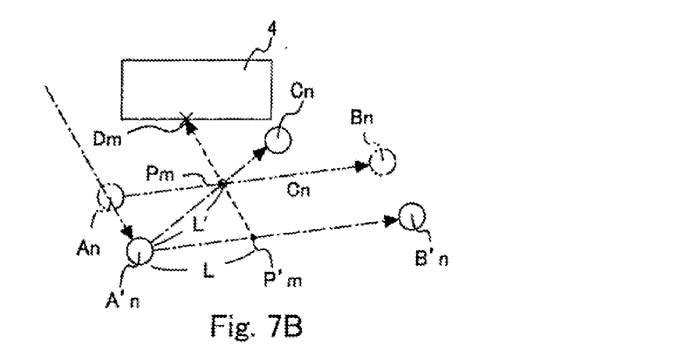
FIG. 7B is a schematic diagram showing steps of second-direction vector correction of a signal output position, which are performed in the imaging inspection apparatus shown in FIG. 1.
Figure 7C:
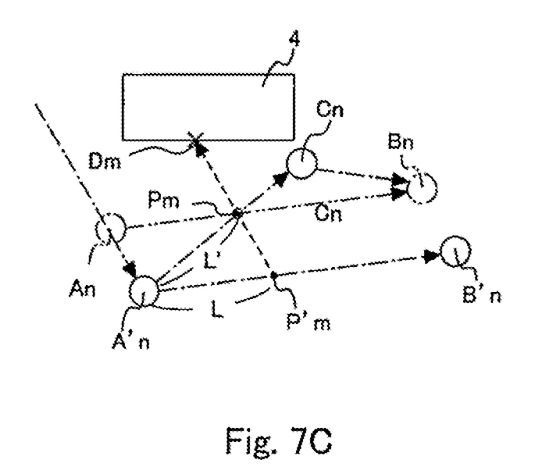
FIG. 7C is a schematic diagram showing steps of second-direction vector correction of a signal output position, which are performed in the imaging inspection apparatus shown in FIG. 1.

Further, the arithmetic operation unit 20 of the control device 2 determines whether or not a difference in the second direction between the actual image-capturing position where the image-capturing device 3 has captured the image based on the signal output position Pm and the predetermined intended image-capturing position is greater than or equal to a predetermined value. If the difference in the second direction is greater than or equal to the predetermined value, the arithmetic operation unit 20 functions as a second direction corrector 26, which performs vector correction with respect to the second direction. FIG. 7A to FIG. 7C are schematic diagrams showing steps of the second-direction vector correction of the signal output position, which are performed in the imaging inspection apparatus shown in FIG. 1.

As shown in FIG. 7A to FIG. 7C, if the difference in the second direction is greater than or equal to the predetermined value, the second direction corrector 26 sets a third position Cn on a straight line that connects a position (actual first position) A'n corresponding to the first position An and an intended image-capturing position Pm, the position (actual first position) A'n being a position where the distal end portion 11 of the robot 10 has actually been located, such that the third position Cn is set at the opposite side to the actual first position A'n with respect to the intended image-capturing position Pm. The second direction corrector 26 sets a predetermined position between the actual first position A'n and the third position Cn as a new signal output position Pm by using a distance L' from a reference position that is based on at least one of the actual first position A'n and the third position Cn.

Specifically, as shown in FIG. 7A, an intended image-capturing position for capturing an image of an image-captured portion Dm of the inspection object 4 is Pm; the first position An and the second position Bn are taught; and the signal output position Pm is set; consequently, a path on which the distal end portion 11 of robot 10 actually moves is such a path as to start horn the actual first position A'n to reach an actual second position B'n; and thereby a position where outputting of an image-capturing command signal actually starts is a signal output position P'm, which is more distant from the inspection object 4 than the intended position Pm in the second direction. This case is taken as an example in the description given below.

If the actual signal output position P'm deviates from the intended image-capturing position Pm in the second direction (i.e., in the front-rear direction of the image capturing) as described above, then the size of the image captured by the image-capturing device 3 varies. Therefore, it is necessary for the image processing device 5 receiving such image data to perform image processing such as scaling, which causes a problem in that the image processing takes time, i.e., the imaging inspection cannot be performed speedily. In view of this, the second direction corrector 26 performs correction on the positional deviation in the second direction, thereby increasing the precision in the image-capturing position and making it possible to perform the image processing more speedily.

If the positional deviation between the intended image-capturing position Pm and the actual signal output position P'm in the second direction is greater than or equal to a predetermined value, then as shown in FIG. 7B, the second direction corrector 26 sets a third position en on a straight line that connects a position (actual first position) A'n corresponding to the first position Cn and the intended position Pm the position tactual first position) A'n being a position where the distal end portion 11 of the robot 10 has actually been located, such that the third position Cn is set at the opposite side to the actual first position A'n with respect to the intended image-capturing position Pm. The third position Cn is set as a taught position for the distal end portion 11 of the robot 10. Moreover, the second direction corrector 26 sets an intended image-capturing position between the actual first position A'n and the third position Cn as a new signal output position Pm, by using a distance L' to the intended image-capturing position Pm from a reference position that is based on at least one of the actual first position A'n and the third position Cn (in FIG. 7A to FIG. 7C, the reference position is the actual first position A'n).

Then, the motion controller 21 gives a motion command for each axis so as to cause the distal end portion 11 of the robot 10 to move from the first position An (in reality, the distal end portion 11 is located at the actual first position A'n) to the second position Bn through the third position Cn. In this manner, the error in the second direction can also be corrected, which makes it possible to improve the positional precision and perform image processing more speedily.

Although the embodiment of the present invention has been described above, the present invention is not limited to the above embodiment, and various improvements, alterations, and modifications can be made to the above embodiment without departing from the spirit of the present invention.

For example, although the above embodiment has described a configuration in which the image-capturing device 3 is mounted on the distal end portion 11 of the robot 10 and the image-capturing device 3 is moved relative to the inspection object 4, the present invention is not limited to this configuration, so long as the image-capturing device 3 and the inspection object 4 can be moved relative to each other by using the robot 10. For example, an alternative configuration may be applicable, in which the inspection object 4 is mounted on the distal end portion 11 of the robot 10 and the inspection object 4 is moved relative to the image-capturing device 3.

The above embodiment has described the robot 10, which includes the six axes J1 to J6. However, the robot 10 is not limited to a six-axis robot, so long as the robot 10 is a robot including a plurality of movable axes. For example, the robot 10 may be a robot including seven axes or more, or may be a robot including five axes or less (and two axes or more).

The above embodiment has described examples in which the reference position for the signal output position Pm is one of the first position An and the second position Bn. However, as an alternative, a position based on both the first position An and the second position Bn may be used as the reference position. For example, the middle point between the first position An and the second position Bn may be used as the reference position, and the signal output position Pm may be set by using a distance from the reference position.

The imaging inspection to which the imaging inspection apparatus according to the present invention is applied is not limited to a specific type of inspection, so long as the inspection is performed by capturing an image of the inspection object by using the image-capturing device. The imaging inspection may be a visual inspection or a non-destructive internal inspection. The type of the image-capturing device used in the imaging inspection apparatus may vary depending on the imaging inspection to be performed.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The imaging inspection apparatus, the control device thereof, and the method of controlling the imaging inspection apparatus, according to the present invention, are useful for increasing the speed of control of the movement of the robot while maintaining high precision in image-capturing positions.

REFERENCE SIGNS LIST 1 imaging inspection apparatus
2 control device (controller)
3 image-capturing device
4 inspection object
5 image processing device (inspection device)
10 robot
11 distal end portion
12 servomotor
13 position detector
20 arithmetic operation unit
21 motion controller
22 storage unit
23 input unit
24 image-capturing command signal generator
25 first direction corrector
26 second direction corrector
J1 to J6 axis

The invention claimed is:

1. A control device of an imaging inspection apparatus in which one of an image-capturing device and an inspection object is mounted on a distal end portion of a robot including a plurality of axes, the imaging inspection apparatus being configured to inspect the inspection object by capturing an image of the inspection object by using the image-capturing device,
the control device comprising:
a motion controller configured to give a motion command for each axis when causing the distal end portion of the robot to move from a first position to a second position, the first position and the second position being taught to the robot;
a storage unit configured to store a predetermined position as a signal output position, the predetermined position being on a line that connects between the taught first position and the taught second position and being set by using a distance from a reference position, the reference position being the taught first position, the taught second position, or a middle point between the taught first position and the taught second position; and
an image-capturing command signal generator configured to determine, while the distal end portion of the robot is being moved from the taught first position to the taught second position, whether or not the distal end portion of the robot is located at the signal output position, and if it is determined that the distal end portion of the robot is located at the signal output position, the image-capturing command signal generator transmits, to the image-capturing device, an image-capturing command signal for capturing an image of the inspection object by using the image-capturing device.

2. The control device of the imaging inspection apparatus according to claim 1, comprising a first direction corrector configured to determine whether or not a difference in a direction of a line connecting the taught first position and the taught second position (hereinafter, a first direction) between an actual image-capturing position where the image-capturing device has captured an image based on the signal output position and a predetermined intended image-capturing position is greater than or equal to a predetermined value, wherein
if the difference in the first direction is greater than or equal to the predetermined value, the first direction corrector corrects the signal output position by changing the distance from the reference position in accordance with the difference.

3. The control device of the imaging inspection apparatus according to claim 1, comprising a second direction corrector configured to determine whether or not a difference in a direction perpendicular to a line connecting the taught first position and the taught second position (hereinafter, a second direction) between an actual image-capturing position where the image-capturing device has captured an image based on the signal output position and a predetermined intended image-capturing position is greater than or equal to a predetermined value, wherein
if the difference in the second direction is greater than or equal to the predetermined value,
the second direction corrector sets a third position on a straight line that connects a position corresponding to the first position (hereinafter, an actual first position) and the intended image-capturing position, the actual first position being a position where the distal end portion of the robot has actually been located, such that the third position is set at an opposite side to the actual first position with respect to the intended image-capturing position, and
the second direction corrector sets a predetermined position between the actual first position and the third position as a new signal output position by using a distance from a reference position that is based on at least one of the actual first position and the third position, and the motion controller gives a motion command for each axis so as to cause the distal end portion of the robot to move from the taught first position to the taught second position through the third position.

4. The control device of the imaging inspection apparatus according to claim 1, wherein
a plurality of the signal output positions are arranged between the taught first position and the taught second position.

5. An imaging inspection apparatus comprising:
a robot including a plurality of axes and configured such that one of an inspection object and an image-capturing device is mounted on a distal end portion of the robot, the robot being configured to move the distal end portion relative to the other one of the inspection object and the image-capturing device;
an inspection device configured to inspect the inspection object based on an image captured by the image-capturing device; and a controller configured to control the robot and the image-capturing device, wherein the controller includes:

a motion controller configured to give a motion command for each axis when causing the distal end portion of the robot to move from a first position to a second position, the first position and the second position being taught to the robot;

a storage unit configured to store a predetermined position as a signal output position, the predetermined position being on a line that connects between the taught first position and the taught second position and being set by using a distance from a reference position, the reference position being the taught first position, the taught second position, or a middle point between the taught first position and the taught second position; and an image-capturing command signal generator configured to determine, while the distal end of the robot is being moved from the taught first position to the taught second position, whether or not the distal end portion of the robot is located at the signal output position, and if it is determined that the distal end portion of the robot is located at the signal output position, the image-capturing command signal generator transmits, to the image-capturing device, an image-capturing command signal for capturing an image of the inspection object by using the image-capturing device.

6. A method of controlling an imaging inspection apparatus in which one of an image-capturing device and an inspection object is mounted on a distal end portion of a robot including a plurality of axes, the imaging inspection apparatus being configured to inspect the inspection object by capturing an image of the inspection object by using the image-capturing device, the method comprising:

giving a motion command for each axis when causing the distal end portion of the robot to move from a first position to a second position, the first position and the second position being taught to the robot;

setting a predetermined position as a signal output position, the predetermined position being on a line that connects between the taught first position and the taught second position and being set by using a distance from a reference position, the reference position being the taught first position, the taught second position, or a middle point between the taught first position and the taught second position; and determining, while the distal end of the robot is being moved from the taught first position to the taught second position, whether or not the distal end portion of the robot is located at the signal output position, and if it is determined that the distal end portion of the robot is located at the signal output position, transmitting, to the image-capturing device, an image-capturing command signal for capturing an image of the inspection object by using the image-capturing device.

7. The control device of the imaging inspection apparatus according to claim 2, comprising a second direction corrector configured to determine whether or not a difference in a direction perpendicular to a line connecting the taught first position and the taught second position (hereinafter, a second direction) between an actual image-capturing position where the image-capturing device has captured an image based on the signal output position and a predetermined intended image-capturing position is greater than or equal to a predetermined value, wherein if the difference in the second direction is greater than or equal to the predetermined value, the second direction corrector sets a third position on a straight line that connects a position corresponding to the first position (hereinafter, an actual first position) and the intended image-capturing position, the actual first position being a position where the distal end portion of the robot has actually been located, such that the third position is set at an opposite side to the actual first position with respect to the intended image-capturing position, and the second direction corrector sets a predetermined position between the first actual position and the third position as a new signal output position by using a distance from a reference position that is based on at least one of the actual first position and the third position, and the motion controller gives a motion command for each axis so as to cause the distal end portion of the robot to move from the taught first position to the taught second position through the third position.

8. The control device of the imaging inspection apparatus according to claim 2, wherein a plurality of the signal output positions are arranged between the taught first position and the taught second position.

9. The control device of the imaging inspection apparatus according to claim 3, wherein a plurality of the signal output positions are arranged between the taught first position and the taught second position.

10. The control device of the imaging inspection apparatus according to claim 7, wherein a plurality of the signal output positions are arranged between the taught first position and the taught second position.

11. The control device of the imaging inspection apparatus according to claim 1, wherein the signal output position is set after the distal end portion of the robot has actually moved from the taught first position toward the taught second position.

12. The imaging inspection apparatus according to claim 5, wherein the signal output position is set after the distal end portion of the robot has actually moved from the taught first position toward the taught second position.

13. The method of controlling an imaging inspection apparatus according to claim 6, wherein the signal output position is set after the distal end portion of the robot has actually moved from the taught first position toward the taught second position.

* * * * *